United States Patent [19]
Goldstein

[11] Patent Number: 5,422,719
[45] Date of Patent: Jun. 6, 1995

[54] MULTI-WAVE-LENGTH SPECTROFLUOROMETER

[75] Inventor: Jack M. Goldstein, Wayland, Mass.

[73] Assignee: Auburn International, Inc., Danvers, Mass.

[21] Appl. No.: 150,962

[22] Filed: Nov. 12, 1993

[51] Int. Cl.[6] .................. G01N 21/61; G01J 3/18; G01J 3/10
[52] U.S. Cl. .................. 356/318; 250/458.1; 356/334
[58] Field of Search ............... 356/51, 317, 318, 319, 356/320, 323, 325, 326, 328, 331, 332, 334; 250/458.1, 459.1, 461.1, 461.2

[56] References Cited

U.S. PATENT DOCUMENTS

| | | | |
|---|---|---|---|
| 2,823,577 | 2/1958 | Machler | 356/303 |
| 3,279,308 | 10/1966 | Bartz et al. | 356/51 |
| 3,522,739 | 8/1970 | Coor et al. | 356/325 |
| 3,532,429 | 10/1970 | Hughes et al. | 356/328 |
| 3,554,649 | 1/1971 | Ridgway | 356/334 |
| 4,022,531 | 5/1977 | Orazio et al. | 356/332 |
| 4,781,456 | 11/1988 | Nogami | 356/51 |

FOREIGN PATENT DOCUMENTS 0045898 2/1982 European Pat. Off. ............ 356/320

Primary Examiner—F. L. Evans
Attorney, Agent, or Firm—Jerry Cohen; Edwin H. Paul

[57] ABSTRACT

A multi-wavelength spectrofluorometer suitable for operation in laboratory, process control environments and in the field. The unit includes a multi-source flash tube, slits, diffraction grating arrangement(s) and other optics whereby a number of different wavelengths are available for exciting the sample. Also, a slit moving along the tubular axis of a single flash tube may be used. The excitation light is directed onto a sample and the luminescent emitted light from the sample is measured for intensity and wavelength. The resulting "signature" is compared with stored "signatures" for identification purposes. A controller with storage, keyboard and display provides interactive operation for the user. Separate memory cards with stored known component signatures and other analysis programs may be inserted into the instrument. Modules for directing the analysis to remote samples and to solid, liquid or gas samples are provided.

16 Claims, 4 Drawing Sheets

MULTI-WAVE-LENGTH SPECTROFLUOROMETER

FIELD OF THE INVENTION

The present invention relates generally to systems for activating luminescence effects in liquid, gaseous and solid materials. More particularly the invention relates to systems for creating spectrally narrow excitation light sources that are sequentially incident on a sample, and then for measuring the magnitude, wavelength and lifetime of the resulting luminescence generated within or reflected from the sample. The present invention relates to making such measurements and displaying the results to the user. Applications of the invention include, but are not limited to, process control and sample analysis. Luminescence is herein defined to generally include both phosphorescence and fluorescence.

BACKGROUND OF THE INVENTION

Environmental issues are of high importance and concern, especially with the ever increasing number and quantity of chemicals being used and shipped throughout the world today. Toxic contamination and chemical spills need to be analyzed for contents before effective measures for clean-up can be made. In many cases time is of the essence to prevent large scale damage.

The chemicals found in many of these contaminating spills often contain polynuclear aromatic hydrocarbons (PHA's) that are intensely luminescent. Such luminescence provides a means for sensitive analysis. For example, an excitation wavelength can be sent via a telephoto lens to a spill and the spectral response from the spill received. Luminescence from any PHA's is readily measured to help locate and partially identify the material. There is extensive data known on the luminescent properties of many materials.

Luminescence occurs when a material is activated by an energy stimulus whereby the molecules are raised to an excited state. When the stimulus ends, these molecules drop back to a less excited state and give off light energy while doing so. Herein, "light" is defined to be substantially the entire electromagnetic spectrum where excitation and luminescence can be found. If the emitted light energy lasts for a short time, the effect is referred to as "fluorescence", and as "phosphorescence" when the emitted energy lasts for a longer duration. In practice these terms are often used interchangeably.

A useful characteristic is the lifetime of the luminescence—this parameter has become a useful tool and has been incorporated into commercial laboratory instrumentation, e.g. see the Perkin Elmer optical instruments using Xenon flash lamps.

Laboratory instruments, usually called spectrofluorometers or fluorometers, use a narrow band (say, 0.5 to 10 nanometers) of uv (ultraviolet) light as an excitation source. The emitted light of a luminescing sample will always be of longer wavelength than the wavelength of the source excitation. This is because lower energy corresponds to longer wavelengths, and due to the law of conservation of energy the emitted light's energy cannot exceed the excitation light's energy. The emitted light will not be of equal wavelength to the excitation light's wavelength (resonance fluorescence), since some of the energy in the system is lost due to molecular collisions and to thermal dissipation. Therefore the emitted light will be of lower energy and hence longer wavelength. The emitted light is selectively filtered according to wavelength, and, then, the intensity of one or more wavelengths is measured via a photodetector. There are many different fluorometers that have been designed for specific functions, for example, as chromatographic detectors, blood analyzers, and the like. These laboratory spectrofluorometers are tapable of selecting the exciting wavelength, usually by a broad wavelength source incident on an angularly positionable diffraction grating that spectrally disperses the light onto an exit slit such that the wavelength of choice passes through the slit to the sample. A luminescent sample emits wavelengths that are received by photodetectors set at right angles to the excitation light beam to prevent direct incidence of the light from the grating on the detectors. A monochromator may be used to select the wavelengths to be measured (or otherwise received) from the sample. From these and related measurements, substances may be identified and quantified. In less sophisticated devices filters may be used in place of monochromators to quantify the expected substance.

Portable fluorometers are commercially available for dedicated functions and do not serve as general purpose fluorometers. The portable units often employ wavelength selective optical filters and usually use mercury source emission lines for excitation. The qualitative and quantitative uses of these devices is very limited. They respond to many fluorescent species without distinguishing among them, and they are not useful for substance identification. Such devices also lack the ability to measure fluorescence in different forms of matter—as is useful for environmental analysis.

Laboratory instruments useful for identifying and quantifying material, e.g. chromatographs, must separate out the majority of the other material before analyzing the remainder. This takes time and skilled effort. For example, a chromatographic analysis to determine if a major pollutant was present in an oil spill involves separating out the 50 to 100 other chemicals which would interfere with the measurement, and such measurements must be done off-line in a laboratory—not at the site or in-situ. Also, such an analysis requires solvents and highly skilled technicians. The above represent significant limitations.

FIG. 1 is a block diagram of a conventional spectrofluorometer. A high pressure xenon UV light source 2 illuminates a scanning excitation monochromator entrance slit 4. The selected wavelength of light exits 6 the monochromator and is focused on a sample 8 to be analyzed. If the sample has luminescent properties, it will emit light with specific spectral characteristics. During the molecular excitation process, the sample can receive light of a narrow-band of wavelengths for quantitative analysis, or the sample can receive light of progressively changing wavelengths for qualitative identification of unknown compounds. The excitation source may be continuous, pulsed by a shutter or by flashing Xenon flash tubes. Perkin Elmer uses such flash tubes for about 20 micro-second flashes synchronized to the power line frequency (60 Hz). This pulsing is useful in order to measure the lifetime of the emissions from the sample. The emissions from the sample illuminate another entrance slit to a measuring, usually scanning, monochromator. The emissions are resolved spectrally and via an exit slit 12 incident on a photodetector for quantification. The photodetector is usually a photomultiplier tube, but photodiode arrays and charge coupled devices (CCD arrays) are becoming popular. The arrays can accept and measure many wavelengths simultaneously. When these arrays are used, care must be taken to calibrate the position of the array such that specific wavelengths of interest strike known diodes since the light received may contain a contiguous range of wavelengths. Once a selected diode in the array receives a selected wavelength, the next diode, and all the remaining diodes will receive different, but known, wavelengths. The physical separation between the diodes and the optical system determines the wavelength separation between two adjacent diodes. When the photomultiplier tube or a single photodiode is used for the detector, an emission spectrum requires some type of scanning of the monochromator's dispersing elements (e.g. moving a diffraction grating) and taking measurements as each wavelength is incident upon the detector. If an excitation spectrum is needed then there must be some type of scanning of the excitation monochromators.

The information from a spectrofluorometer is presented usually in the two dimensional graph of excitation wavelength vs. emission intensity, or emission wavelength vs. emission intensity. Three dimensional graphs can be produced with sophisticated software. In such cases, the data are fed into a computer to assimilate, normalize or otherwise prepare the data and then display that data. Mechanical monochromators are limited for use with such data presentations since generating the data with mechanical monochromators is tedious and time consuming. There is a continuing need (and limitation of prior art) to integrate all such luminescence information for compound identification.

Expert systems have been developed in recent years. Such systems accumulate large databases and apply sophisticated software for "expertly" performing a given task. There is a need to improve the speed of accumulating such data.

Photo arrays have allowed the detection side of spectrofluorometers to be simplified and made faster by obviating the mechanical scanning of the diffraction grating. But, such systems are still limited by the required mechanical complexity and slowness of rotating a diffraction grating to obtain multiple excitation wavelength.

It is a principal object of the present invention to provide a fast method of identification and quantification of luminescent materials on-site.

It is an object of the present invention to provide for an instrument that provides an excitation spectrum and an emission spectrum with minimal moving parts.

It is another object of this invention to provide apparatus that can spectrally discriminate similar compounds by analyzing the total luminescent properties of such compounds. Such a technique is referred to as multidimensional luminescence (MDL) analysis.

It is an object of this invention to provide apparatus for use in "expert systems".

It is another object of the present invention to provide a qualitative and quantitative spectrofluorometer instrument suitable for measuring matter in solid, liquid or gaseous form.

It is yet another object of the present invention to measure the duration and polarization of the emitted light from a sample under test.

Yet another object of the present invention is to provide all such data to a computer for display in three dimensional plots.

It is yet another object of this invention to provide means to analyze any material that can be made to luminesce, including biological agents.

SUMMARY OF THE INVENTION

According to the present invention, the foregoing and other objects and advantages are attained by providing a multi-wavelength spectrofluorometer, including means for diffracting a light beam, at least two excitation sources and slits distributed along the focal surface of the diffraction means, each source and slit arranged to emit light to the diffraction means, an exit slit means for accepting diffracted light, means for directing the exiting diffracted light to a sample, means for receiving light from the sample, and means for measuring and analyzing said received light.

In a preferred embodiment, the excitation sources are multiple Xenon flash tubes, In another preferred embodiment the excitation source includes at least one flash tube distributed about parallel along the focal surface of the diffraction means, and slit means arranged and constructed to move in the focal plane surface of the diffraction means, so that the excitation source light passes through the moving slit and strikes the diffraction means at a plurality of angles to the diffraction means. An advantage of such an invention is that more energy is provided to the sample and there are no moving optics. Such a system with fixed optical components is suitable for operation in the field, and with a battery pack becomes portable.

In another preferred embodiment the means for receiving, measuring and analyzing light from the sample comprises: an entrance slit means arranged and constructed to allow light from the sample to pass, second diffraction means for dispersing said sample light into its component wavelengths, and photodetector means arranged to receive the dispersed sample light and to quantify said received light. The photodetector in a preferred embodiment includes a photodiode array or a charge coupled detector, or wavelength selective PM tube.

Further, the position of said photodetectors provides a known band of wavelengths around a known wavelength, each said known wavelength and band corresponding to a given excitation slit position and width and the entrance slit width.

In another preferred embodiment the arrangement of positions of the excitation sources and slits is arranged and constructed to produce light exiting from the exit slit that comprises light of multi-orders of diffraction, where said orders correspond to the position of said excitation source and slit.

The invention is also drawn to apparatus including: controller means for positioning said excitation slits and firing said excitation sources, said controller arranged and constructed for accumulating and storing the measured data, and interactive means to display the measured data in contour plots and three dimensional plots, the interactive means including participation of a user of said apparatus. The controller means also includes means for storing said measured data, means for storing known data (signatures) of known materials, means for displaying said measured data, means for analyzing the measured data by comparing the measured data to the signature data, wherein the sample is identified and quantified.

Also, sample modules with capability to direct light to and from the sample include: lens means that receives said diffracted light and projects that light onto a distant sample and where said lens means receives light from said sample, and means to direct the received light to the measuring means. A preferred means to direct light to and from the sample comprises a fiber optic bundle. Other preferred means to direct light to and from the sample comprises a liquid flow cell and a gas filled chamber. The sample modules that can accommodate matter in gaseous, solid or liquid form provide advantages for field operation.

Other objects, features and advantages will be apparent from the following detailed description of preferred embodiments thereof taken in conjunction with the accompanying drawings in which:

DESCRIPTION OF PREFERRED EMBODIMENTS

Figure 1:
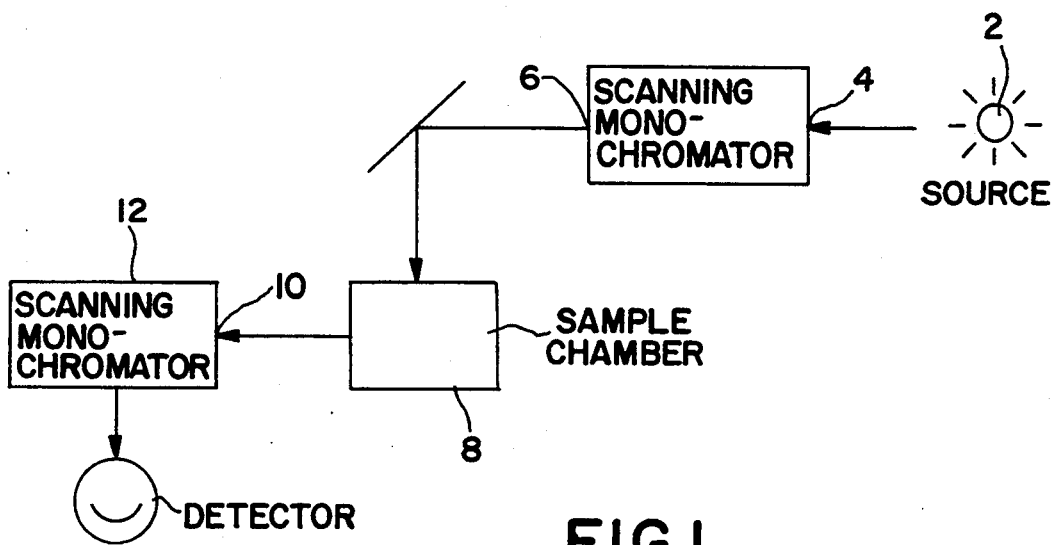
FIG. 1 is a block diagram of prior art spectrofluorometers.
Figure 2:
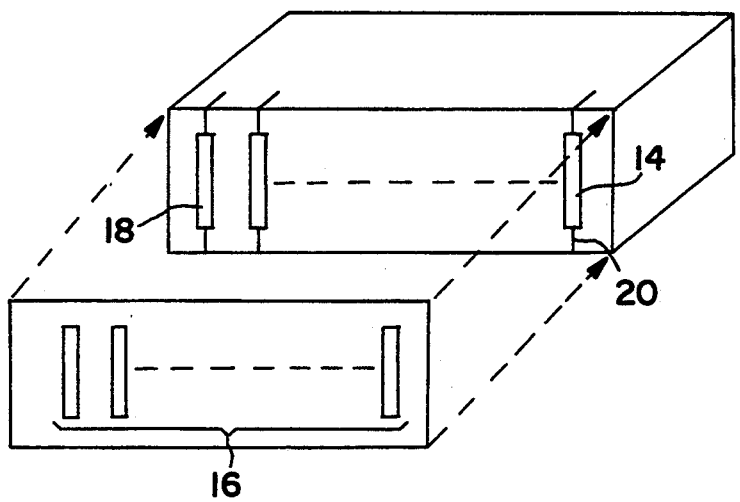
FIG. 2 is a pictorial sketch of a flash lamp assembly according to a preferred embodiment of the present invention.

FIG. 2 shows a grouping of a multichannel or multiwavelength excitation source—an array of 10 Xenon flash tubes 14 arranged and constructed with a linear array of 10 corresponding (one for one) excitation slits 16. In other preferred embodiments fewer or more flash lamps/slits are used. These slits replace the single entrance slit to the excitation monochromator. The linear array of slits is arranged to be on the same focal plane of the single slit (of a conventional excitation monochromator). In this preferred embodiment each flash tube is triggered by circuitry (not shown) sequentially in time such that one flash occurs and is completed before another tube is flashed, although in other preferred embodiments combinations could be flashed. The tubes are flashed in order from position 18 to 20, although the order is altered in other preferred embodiments. The tubes 14 are small in aspect and emit a short duration light flash with a wide spectral distribution—Xenon flash tubes are used in this embodiment, such lamps are readily available from commercial sources. In other preferred embodiments, continuous incandescent lamps are used with solid state optical shutters, as are found in the art.

Figure 3:
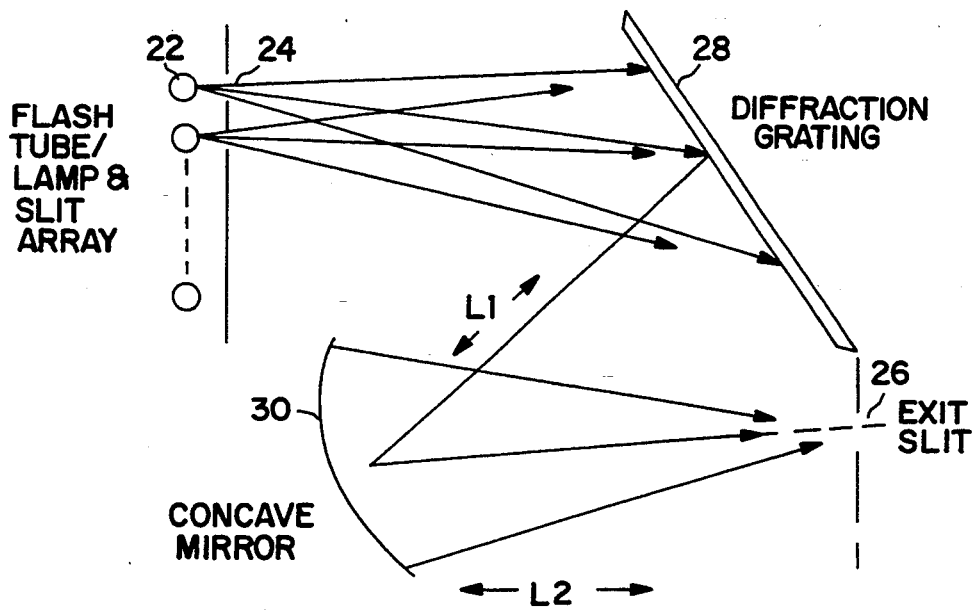
FIG. 3 is a detailed pictorial sketch of an optics bench component according to a preferred embodiment of the present invention.

The optical bench used in a preferred embodiment is of the known Monk-Gillieson type, and is shown in FIG. 3. In this design, the incident light to the diffraction grating is divergent, not collimated. This results in a small compact design where the entrance slits can be larger than the exit slit. This difference may also be expressed as follows: the spectral dispersion length at the entrance slit can be many times that occurring at the exit slit. These preceding features facts allow the use of flash tubes that are many times larger than would be required in a conventional optical bench design. For example, if the distance of the entrance slit to the converging mirror were four times longer than the distance of the converging mirror to the exit slit, an object at the entrance slit would be four times larger than it would be in a conventional design. A more common conventional design would use collimated light and have equal sized entrance and exit slits. This means that a two millimeter bore flash tube in the present design would have equivalent bandwidth to that of a half millimeter bore flash tube in a conventional design. For an equivalent spectral bandpass, the monochromator of the present design theoretically will yield sixteen times more energy from the two millimeter flash tube than a conventional half millimeter flash tube. This is desirable, since it allows flash tubes to be used that are more readily available (larger [2 mm]sized flash tubes are more available than smaller [0.5 mm]). The array of flash tubes 22 have associated slits 24 arranged in the focal plane of the monochromator. In other words, each of the slits 24 is in focus on the single exit slit 26. Since the slits 24 are physically offset from each other, the same Xenon spectrum flashed by each of the ten lamps will cause a spectrally offset diffracted spectrum from the grating 28, the spectrum is then focused by the concave mirror 30 on the exit slit 26—resulting in ten separate spectral groups of wavelengths of light exiting the exit slit. When the ten tubes are fired (synonymous with triggered or flashed) there will be ten separate spectra, each representing the effect of the selected fired lamp's emission spectrum.

In another preferred embodiment (not shown), a concave holographic diffraction grating is used which is focused on the exit slit directly. Such a grating is designed, in yet another preferred embodiment, to give a magnification ratio equivalent to a Monk-Gillieson optical bench and, therefore, to be equally advantageous.

Figures 1, 4A:
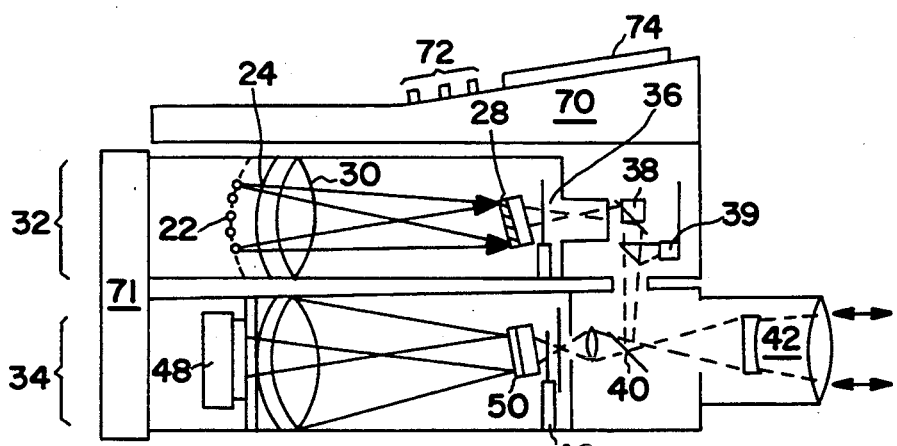
FIG. 4A, 4B and 4C are block diagrams/ray tracings showing optical hardware operation of several preferred embodiments.
Figures 2, 4A:
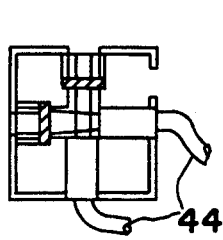
Figures 3, 4A:
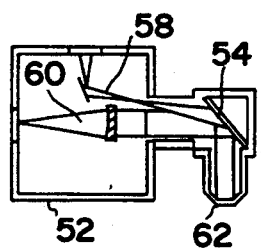
Figures 4, 4A:
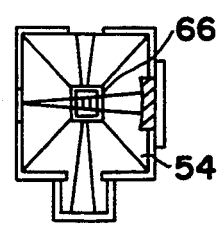
Figures 4, 4A, 5:
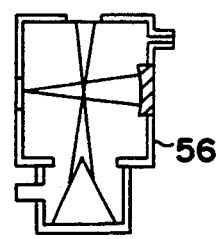

FIG. 4A is shows a preferred embodiment of the present invention in the form of a "spotter module" where excitation wavelengths are focused on a distant sample by the lens system 42, and where the same lens system 42 receives the emissions from the sample. A monochromator as in FIG. 3 serves as the excitation source 32 and a similar monochromator as the emission monochromator 34. The excitation light leaving the exit slit 36 is reflected by a beam steering mirror 38 and focused at a beam splitter, "sampling juncture" 40, which sends the excitation light energy out through the lens 42 to a distant sample. A portion of the light reflected from the mirror 38 is taken off by a beam splitter for intensity measurement 39. The intensity measurement is stored in a computer 70 and used to monitor the excitation lamp. The excitation level is used to normalize the measurements via a ratio technique where the incident intensity is compared to the emission intensity in a ratio form so as to make the measurements independent of the excitation light intensity. If the lamp intensity becomes too low, the lamp is then replaced. In another preferred embodiment, a fiber optics probe 44 directs the excitation light to, and receives the emitted light from, the sample. Such a fiber optic probe, in another preferred embodiment, has immobilized chemicals or enzymes that react with substances to enhance the level of emitted light from the sample—referred to as fiber optic chemical sensors (FOCS) useful in remote fiber spectroscopy. A shutter 46, if needed, prevents any excitation light from striking the photosensing array 48. After the excitation light is fired, the shutter opens and emission light from the sample is focused via the lens 42 onto the beam splitter 40 and then through the open shutter into the receiving monochromator 34. The received emission is directed to the diffraction grating 50 and the diffracted light therefrom to a linear array of diodes 48. This array is distributed along the focal plane of the grating and is positioned to receive a known band (or range) of light wavelengths. The array has 20 photodiodes which measure 20 specific wavelengths (actually a small range around each of the 20 wavelengths). This arrangement provides for twenty times twenty or 400 measurements each time the lamps are fired in sequence, and this set of measurements can occur within a short time measured in seconds or even less than a second.

The "spotter module" can be replaced with other modules which accommodate solid 52, liquid 54 or gas 56 samples.

In the module 52 for solids or turbid samples, the excitation and emission light paths are at a narrow angle when striking the sample, or as shown the two beams are combined by a dichroic beam splitter 64 and the light reflected from the sample at 62 is measured. In the module 54 for liquids, a sample chamber 66 is placed at the above referenced "sampling juncture". This sample chamber 66 is a flow cell into which a flowing sample may be directed in another preferred embodiment. In the module 56, a gas containing vial, or the like, is placed at the "sampling juncture". For modules 54 and 56 the arrangement of excitation light incident on the sample is arranged to be at 90° from the direction that the luminescence is viewed and measured.

Still referring to FIG. 4A, this preferred embodiment has an internal dedicated computer 70, with a keypad 72 and LCD graphics display 74. The computer board contains a 486 (Intel designated Chip) processor (other equivalent or advanced chips may be used), such boards are readily available with many different configurations re: memory, I/O, etc. This particular board is four inches by six and has data storage capability, display and keypad interfaces and multiple other peripheral interface ports. The board contains an embedded MS-DOS (Microsoft DOS) or other like operating system to facilitate software development, to ease use and to programportability. In addition RAM/ROM memory cards may be added to augment storage and program memory space. Such memory cards allow the use of "library" cards where observed spectral patterns of known compounds can be added for direct comparison. Portability of the instrument is provided by the removable rechargeable battery pack 71.

Figure 5A:
FIG. 5A and 5B are pictorial sketches of data presentations generated in such preferred embodiments.
Figure 5B:
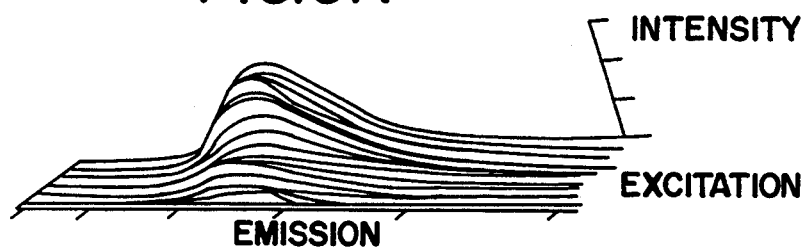
Figure 6:
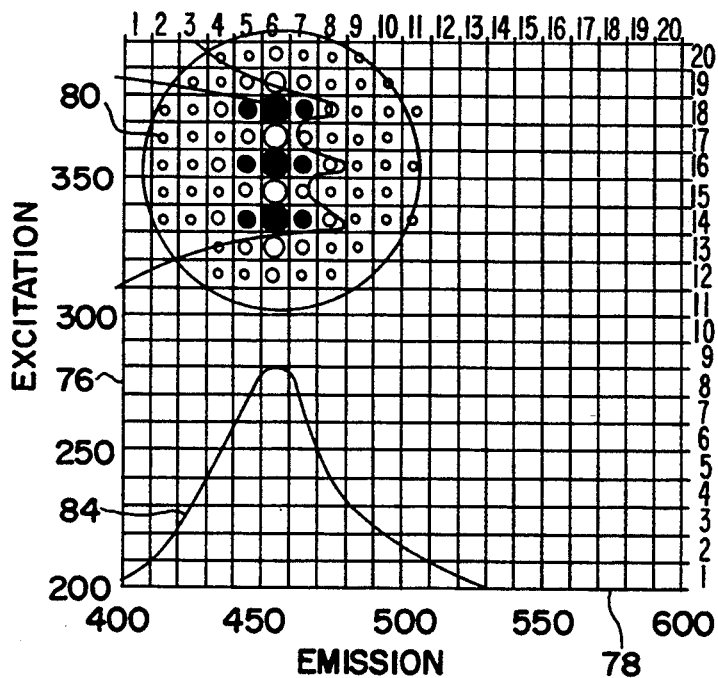
FIG. 6 is a representation of graphical presentation of data that can be made with such embodiments.

As described above, twenty lamps and twenty photodiodes provide for 400 measurements in a short time. In another preferred embodiment ten lamps and a refractor plate (not shown) to shift the spectrum are used. The data are collected and displayed in the form of contour maps and three-dimensional isometric views. FIG. 5A is such a contour map where the excitation wavelengths are on the ordinate and the emission wavelengths on the abscissa with the 400 intensity measurements graphically represented in contours of equal intensity (like an isobar pressure chart used for weather forecasting). FIG. 5B shows the same data in an isometric three dimensional view.

Figures 1, 4B:
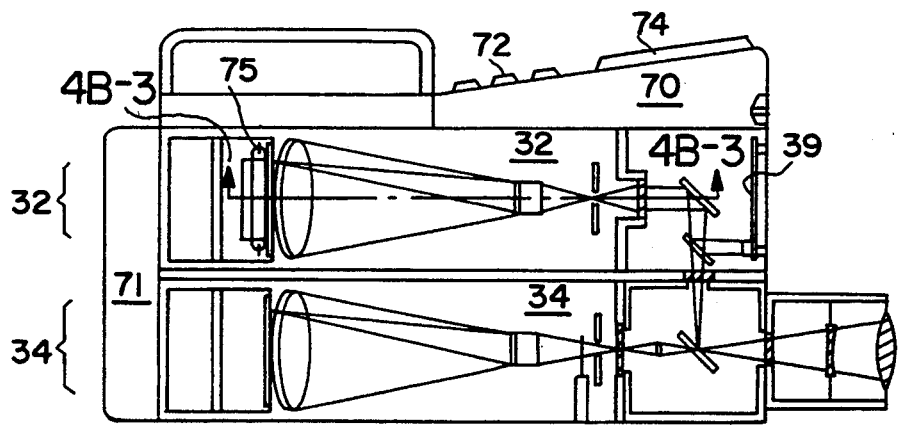
Figures 2, 4B:
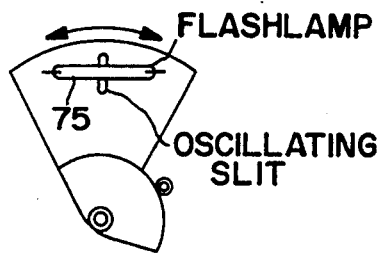
Figures 3, 4B:
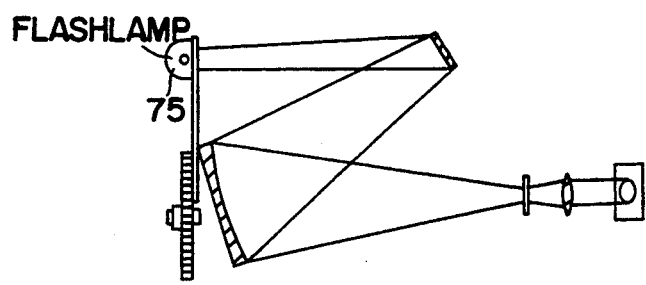

Another preferred embodiment is shown in FIG. 4B. This apparatus is different from that in FIG. 4A in that a single four millimeter flash tube is used 75 length-wise along the focal plane of the excitation monochromator. An oscillating slit 73 moves rapidly step-wise, stopping at each of twenty step positions, along the length of the flash tube. The effect is identical to having twenty separate flash tubes positioned at each slit step position. In this preferred embodiment, the oscillating slit steps to each position in 100 milliseconds or less. Section A—A shows the optical path in more detail.

Figure 4C:
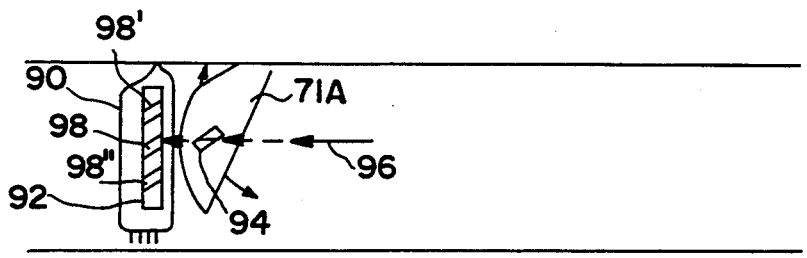

FIG. 4C is another preferred embodiment where a moving slit apparatus 71A is arranged in front of the emission detector, here a photo-multiplier (PM) tube 90. The cathode 98 (the active receiving part of the PM tube) is an elongated surface where the emission light rays 96 pass through the slit 94 and strike the cathode at location 98, as shown. However, as the slit moves, the slit 94 directs the emission light to 98' and to 98" at different times. Such a moving slit at the detector selects by the slit's position the wavelength of light striking the PM tube. Such PM tubes are available commercially with cathodes over one inch long making the apparatus of FIG. 4C practical. The advantage of PM tubes is their high sensitivity, low noise, low dark current and low temperature coefficient. In this embodiment the dark current characteristic is important since the dark current depends on the entire cathode area while only a small portion of the cathode is receiving light. Performance would be degraded from use of the entire cathode surface, but even with this performance loss such an instrument has sufficient performance for many analyses. The possibility of the level of PM dark current adversely affecting the performance of the analyzer will be avoided by using "photon counting" circuitry to measure the PM tube signal. In this technique, dark pulses generated by the PM tube have a shorter pulse height than light generated pulses emanating from the PM tube. This height difference is advantageously used to discriminate such pulses. In another preferred embodiment a solid state shutter of liquid crystal display material (not shown) could be used generally in the visible light range.

In order to reduce noise and optimize the signal to noise ratio in such systems, the sequential firing of the twenty lamps is repeated many times and the results averaged (such noise reduction is known in the art). The averaged result is smoothed using readily available digital filtering algorithms. The number of repeats is programmable by the user, but the system will generate a suitable number as a default. This system can be programmed to provide ten to thirty analysis cycles per minute.

In a preferred embodiment a twenty by twenty array of pixel groups on an LCD display is used. This type of display is an "Emission Excitation Matrix" (EEM). The twenty excitation wavelengths on one axis 76, the emission wavelengths on the other 78 and the intensity is displayed by the sizes of the circles within each pixel group. The higher intensities are represented by larger circles 82 and the lesser intensities by the smaller circles 80. A conventional graph of intensities at one excitation frequency is shown at 84. The present system would allow each excitation wavelength to be presented in a similar way. Such EEM presentations are used for species identification, where concentration information would be calculated by known-in-the-art mathematical techniques. All data and measurement information are transferable to a memory card that may be separately transported for review, or alternatively the data may be directly down loaded to another computer or sent via modem for further analysis and evaluation.

Conventional plots are presented in other preferred embodiments. These include: excitation and emission spectra, derivative plots, and synchronous scans.

In this preferred embodiment such measured and library data are useful for identification of luminescent materials, especially for fast on-site identification. For example, an oil spill contaminant can be measured on-site more efficiently than by any laboratory instrument. One important advantage is that other components need not be separated out in order to identify and quantify the major oil pollutants.

PATTERN RECOGNITION

Figure 7A:
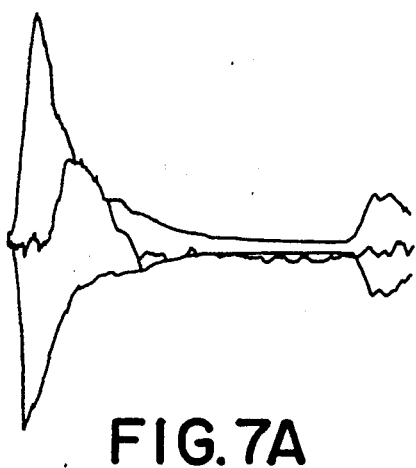
FIG. 7A and 7B are such graphical representations of data from No. 2 fuel oil.
Figure 7B:
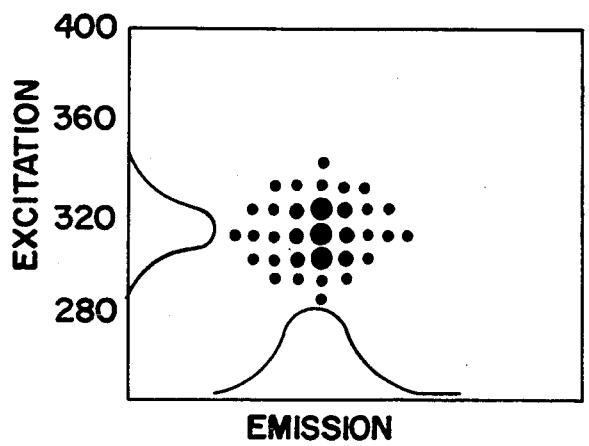

Each luminescent compound or mixture will have a unique excitation/emission/matrix data array characteristic (EEM signature) which is useful for identification of that specific material. Extensive libraries of luminescent spectra exist, including important compounds like polycyclic hydrocarbons that are found in oil contaminants. Such data are loaded into the memory cards where the data are compared with the "signature" of the unknown contaminant. More sophisticated analysis can be performed by multiple sequential subtraction of known spectra from the unknown or summing known spectra to synthesize the unknown signature. Such techniques combined with the known characteristics of any particular oil spill serve to reduce the number of contaminant candidates such that identification can be made. In addition, similar techniques are used in other preferred embodiments to ensure the absence of particular contaminants in an unknown sample. An example of such uses is found in, "OIL IDENTIFICATION RECENT DEVELOPMENTS IN FLUORESCENCE AND LOW TEMPERATURE LUMINESCENCE", by Eastwood et al., American Lab. 10, 454–55(1977). This article shows the difference and single emission spectra for No. 2 fuel oil. The results are obtained on a conventional spectrofluorometer. By using a special attachment, both weathered oil and unweathered oil can be examined differentially. The spectra, shown in FIG. 7A and 7B clearly show the effect of weathering. In the present invention the same information is displayed three dimensionally by examining oil in the field and comparing it to a library signature of the EEM spectra of No. 2 fuel oil whereby the pattern of FIG. 7B is generated.

CALIBRATION

The preferred embodiment is a portable system where calibration is best considered as a two tier process. First there is a primary "multipoint" calibration. This is performed in the laboratory with graded concentrations of quinine sulfate in perchloric acid, or other known standards. This calibration is done every six months to ensure a linear response and a known level of performance. The secondary calibration is "single point" and can be done "on site". This calibration is often referred to as a "span calibration". The instrument is placed in a "zero" condition by use of an appropriate reference sample that would be similar to the material to be analyzed, but known to be free of fluorescence. Pressing the "ZERO"0 key automatically zeros the analyzer by setting whatever is "read" by the photodetector as being zero. Next a solid fluorescent rod is inserted into the sampling module being used. The user presses "SPAN" and the instrument performs the necessary measurement and calibration to output a level that is associated with the rod. In this way, a zero signal position is set, and a known signal level is set. These two known set points establish a calibrated scale. An unknown sample is measured and the intensity measurement at specific wavelengths is placed on the calibrated scale. The resulting pattern of measurements is related to the pattern of the quinine sulfate or other standard. It is important to realize that such a field calibration is made possible by the fixed design of the instrument. The wavelength calibration cannot change since all the optical pieces are permanently set in position eliminating the need for positional adjustments. As discussed before, the flash intensity of the source excitation is measured and used as a ratio such that intensity level changes in the incident light are normalized out.

In this preferred embodiment, the relative spectral sensitivity of the photodetector system may change with time, temperature and the environment and thus require periodic calibration. The solid fluorescent rod serves this purpose. The solid rod is a polymethyl methacrylate matrix containing stable fluorescent materials such as anthracene, naphthalene and ovalene. The fluorescing matrix has stable emission characteristics throughout the spectral region covered by the photodetector. Compound information is stored on the insertable memory card containing the compounds at known concentrations and the software protocol establishes concentration compatibility between the stored information and the analyzer.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Multi-wavelength spectrofluorometer comprising:
   (a) means for diffracting a light beam,
   (b) at least two flash tube excitation source means and at least two slit means arranged and constructed for emitting light onto the diffraction means from at least two separate positions along the focal surface of the diffraction means,
   (c) an exit slit means for accepting light from the diffraction means,
   (d) means for directing the exiting diffracted light to a sample,
   (e) means for receiving light from the sample, and
   (f) means for measuring and spectrally analyzing said received light.

2. Apparatus as defined in claim 1 wherein the means for receiving, measuring and analyzing light from the sample comprises:
   an entrance slit arranged and constructed to allow light from the sample to pass,
   second diffraction means for dispersing said sample light into its component wavelengths, and
   photodetector means arranged to receive the dispersed sample light and to quantify said received light.

3. Apparatus as defined in claim 2 wherein the photodetector means comprises a photodiode array.

4. Apparatus as defined in claim 2 wherein the photodetector means comprises a charge coupled detector.

5. Apparatus as defined in claim 2 wherein the photodetector means comprises a photo-multiplier (PM)tube.

6. Apparatus as defined in claim 2 and further comprising:
  means to position said photodetector means such that a known band of wavelengths is centered at a known wavelength, each said known wavelength and band corresponding to a given excitation slit position and width and said entrance slit width.

7. Apparatus as defined in claim 6 wherein the arrangement of positions of the excitation source means and slits means is arranged and constructed to produce light passing through the exit slit that comprises light of multi-orders of diffraction, where said orders correspond to the position of said excitation source means and slit means.

8. Apparatus as defined in claim 1 wherein the means for receiving light from said sample comprises a photodetector elongated along a longitudinal axis, said axis substantially normal to said received light, and a slit arranged and constructed to move parallel to said axis so that the received light passing through the slit strikes the photodetector such that the wavelength of light striking said photodetector is determined by the position of the slit along said axis.

9. Apparatus as defined in claim 1 and further comprising:
  controller means for positioning said excitation slit means and firing said excitation source means, said controller arranged and constructed for accumulating and storing the measured data,
  interactive means to display the measured data in contour plots and three dimensional plots, the interactive means including participation of a user of said apparatus, and
  battery means to power the apparatus in the field such that the apparatus is portable.

10. Apparatus as defined in claim 9 further comprising:
  means for storing said measured data,
  means for storing known data (signatures) of known materials,
  means for displaying said measured data,
  means for analyzing the measured data by comparing the measured data to the signature data, wherein the sample is identified and quantified.

11. Apparatus as defined in claim 1 wherein the means to direct light to and from the sample comprises:
  lens means that receives said diffracted light and projects that light onto a distant sample and where said lens means receives light from said sample, and
  means to direct the received light to the measuring means.

12. Apparatus as defined in claim 1 wherein the means to direct light to and from the sample comprises a fiber optic bundle.

13. Apparatus as defined in claim 1 wherein the means to direct light to and from the sample comprises:
  means to direct excitation light onto a solid sample and receive light from the sample.

14. Apparatus as defined in claim 1 wherein the means to direct light to and from the sample comprises:
  means to direct excitation light onto a flow cell and means to direct light from the flow cell at an angle of about 90° from the excitation light direction.

15. Apparatus as defined in claim 1 wherein the means to direct light to and from the sample comprises:
  means to direct excitation light onto a gas filled cell and means to direct light from the gas filled cell at an angle of about 90° from the excitation light direction.

16. Multi-wavelength spectrofluorometer comprising:
  (a) means for diffracting a light beam,
  (b) excitation source means and slit means arranged and constructed for emitting light onto the diffraction means from at least two separate positions along the focal surface of the diffraction means, wherein said excitation source means and said slit means comprise a flash tube having a longitudinal axis that is distributed about parallel with the focal surface of the diffraction means and a slit arranged and constructed to move in the focal surface of the diffraction means, so that the excitation source light passes through the moving slit strikes the diffraction means from different positions along the focal surface of the diffraction means at an angle determined by the moving slit's position when said flash tube is triggered,
  (c) an exit slit means for accepting light from the diffraction means,
  (d) means for directing the exiting diffracted light to a sample,
  (e) means for receiving light from the sample, and
  (f) means for measuring and spectrally analyzing said received light.

* * * * *